United States Patent [19]

Swars

[11] Patent Number: 5,193,414
[45] Date of Patent: * Mar. 16, 1993

[54] ASSEMBLED SHAFT

[75] Inventor: Helmut Swars, Bergisch Gladbach, Fed. Rep. of Germany

[73] Assignee: Mannesmann Aktiengesellschaft, Dusseldorf, Fed. Rep. of Germany

[*] Notice: The portion of the term of this patent subsequent to May 14, 2008 has been disclaimed.

[21] Appl. No.: 431,647

[22] Filed: Nov. 3, 1989

[30] Foreign Application Priority Data

Nov. 3, 1988 [DE] Fed. Rep. of Germany ....... 3837291

[51] Int. Cl.$^5$ .............................................. F16C 3/04
[52] U.S. Cl. ..................................... 74/595; 74/598; 29/888.08
[58] Field of Search ....................... 74/595–598, 74/603, 605; 29/6, 888.08, 447

[56] References Cited

U.S. PATENT DOCUMENTS

| 1,891,505 | 12/1932 | Scudder | 74/595 |
| 1,931,861 | 10/1933 | Croom | 74/600 |
| 2,013,039 | 9/1935 | Dusevoir | 74/598 |
| 2,151,624 | 3/1939 | Smith-Clarke | 74/598 |
| 2,326,866 | 8/1943 | Kincaid | 287/124 |
| 4,928,550 | 5/1990 | Sakai et al. | 74/595 |

FOREIGN PATENT DOCUMENTS

| 589451 | 11/1933 | Fed. Rep. of Germany . |
| 3737600 | 5/1989 | Fed. Rep. of Germany . |
| 3800912 | 7/1989 | Fed. Rep. of Germany . |
| 0103112 | 8/1980 | Japan . |

Primary Examiner—David A. Scherbel
Assistant Examiner—Winnie Yip
Attorney, Agent, or Firm—Anderson Kill Olick & Oshinsky

[57] ABSTRACT

An assembled shaft in the case of which sleeves are inserted into tubular members for the purpose of connecting tubular portions inserted into each other or abutting each other and/or for attaching elements slid on to the tubular members, which sleeves are radially deformable beyond their limit of elasticity by internal pressure application. This assembled shaft includes sleeves each having a cylindrical portion for resting against the tubular member as well as end faces with round apertures for sealing on a reduced diameter.

18 Claims, 3 Drawing Sheets

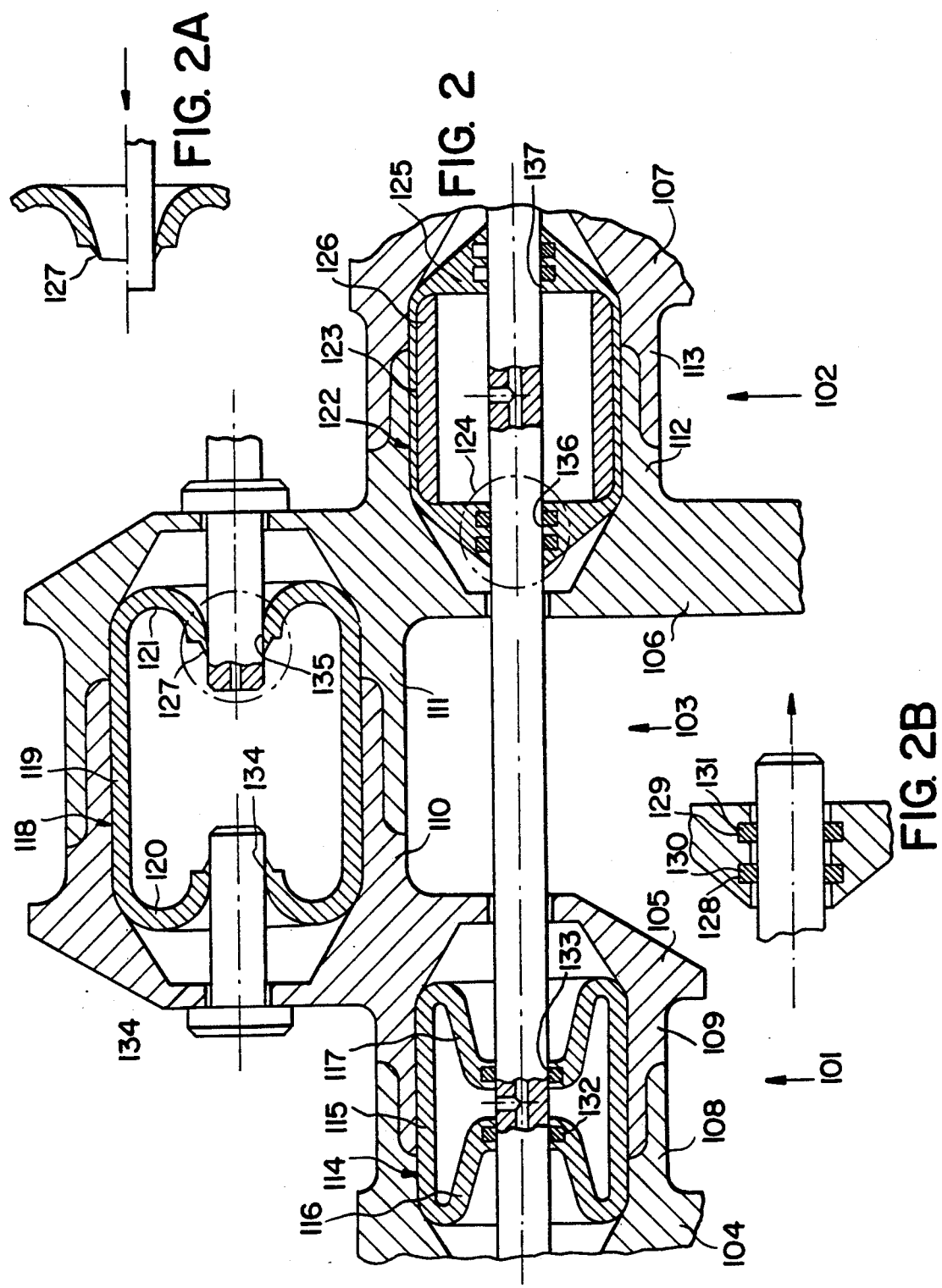

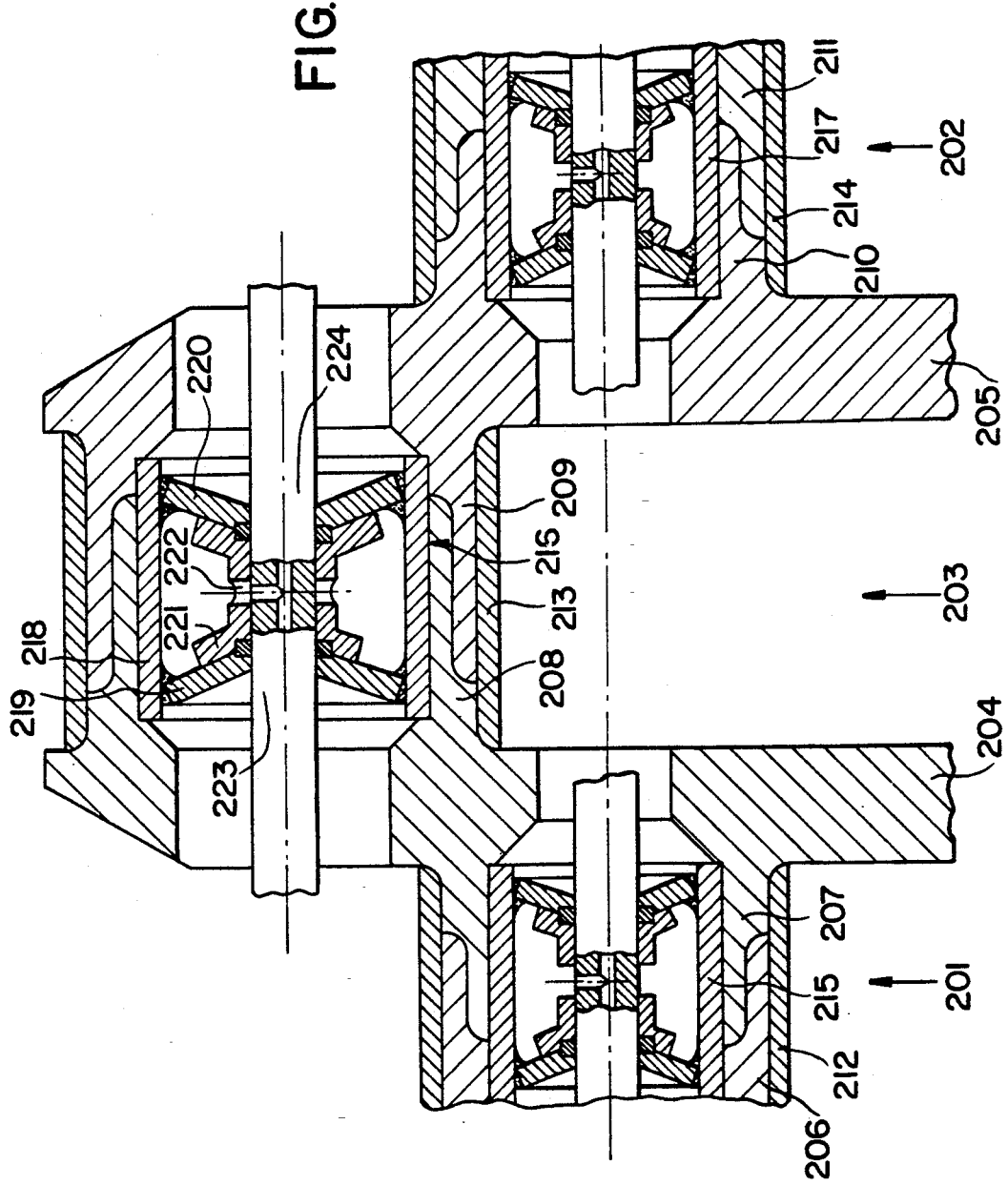

ASSEMBLED SHAFT

BACKGROUND OF THE INVENTION

The invention relates to an assembled shaft which has sleeves inserted into tubular members for the purpose of connecting tubular portions inserted into each other or abutting each other and/or for attaching elements slid on to the tubular members. The sleeves are radially deformed beyond their limit of elasticity by internal pressure application. Assembled shafts of this type are described as crankshafts, transmission shafts or camshafts in earlier applications P 38 00 912, P 37 37 600 and P 38 03 684, for example. The purpose of the slid-in sleeve is to generate the internal pretension required for fixing or attaching purposes in cases where the tube material is unsuitable because of too small a wall thickness or unfavorable material properties.

The diameter of the sleeves used, which is essentially orientated on the diameter of the camshafts, crankshafts or transmission shafts, is relatively large so that correspondingly large pressure agent probes have to be used for carrying out the hydraulic expansion operation. The correspondingly large seals which have a limited service life are relatively expensive and work in their grooves during pressure application so that they have to be replaced relatively frequently.

SUMMARY OF THE INVENTION

Accordingly, it is an object of the present invention to provide an assembled shaft of the above-mentioned type in which the sealing problems are alleviated.

Pursuant to this object, and others which will become apparent hereafter, one aspect of the present invention resides in the sleeves each comprising a cylindrical portion for resting against the tubular member, as well as end faces with round apertures for sealing on a reduced diameter. Such a sleeve design reduces the absolute size of the aperture to be sealed so that, independently of the design of the seal, there are produced individual small and thus cost-effective seals or sealing zones. It is particularly advantageous that the sealing regions in the apertures in the end faces (in contrast to the cylindrical faces to be sealed in the case of smooth sleeves) are not themselves directly subjected to plastic deformation, but are essentially free from deformation or, if the end faces are suitably designed, are subject to a deformation in the sense of reducing the size of the aperture, thereby achieving an additional sealing effect. In any case, the sealing aperture is simplified. A further essential advantage of the present invention is that the end faces (if the shafts are designed as crankshafts) inserted into each other in the region of the pins, represent faces which may participate in the force locking connection. This is a very significant additional effect of the sleeves designed in accordance with the invention. There exists a further advantage in that the apertures with a reduced diameter do not have to be positioned coaxially in the sleeves, but may be radially offset so that, again in the case of crankshafts, it is only this design which permits effective sealing, with the main pin and crank pin clearly overlapping radially.

According to a first embodiment of the invention, the sealing regions are provided in the form of cylindrical projections outwardly adjoining the radial end faces, thereby permitting the use of double seals and the possibility of building up a graduated counter pressure between two seals.

According to a second embodiment, the sealing regions are provided in essentially radial end faces whose wall thickness is increased relative to that of the cylindrical center portion. This design, too, permits careful sealing, and at the same time ensures that the application of pressure does not cause the end faces to be deformed to any considerable extent, neither causing deformation in the radial direction nor bulging in the axial direction.

According to a further embodiment, the wall thickness of the end faces increases continuously, especially inwardly. Again, this permits accurate sealing while the relatively uniform, radial deformation of the cylindrical sleeve along the entire length is inhibited to a lesser extent.

According to yet another embodiment, the sealing regions are provided in end faces which are recessed axially inwardly relative to the central portion. This has an advantageous effect in that the internal pressure applied to the sleeves deforms the conical end faces in such a way that an additional radial pressure relative to an inserted pressure agent probe is generated, with either the end wall, with a uniform wall thickness, being deformed inwardly in a funnel-like way, or it is possible to provide an increased wall thickness for increasing the sealing face. In a particularly advantageous embodiment, the end faces positioned opposite each other may nearly contact each other in the center of the sleeve.

According to yet another embodiment, the end faces, in the form of separate conical annular discs, are inserted into cylindrical sleeves and are fixed in their inner apertures by being pressed or caulked in. When the sleeve is subjected to internal pressure, these conical discs are deformed in such a way that their outer rhombuses are pressed into the cylindrical sleeve while at the same time reducing the size of the aperture in the sense of achieving an additional sealing effect.

The sealing regions in inner-cylindrical designs may be provided with sealing rings which remain in position after the expansion operation and are regarded as lost parts. This is advantageous in that the seals may be of an inferior quality and that there is no risk of unexpected seal failure. This makes it possible to use seal-less smooth pressure agent probes of a small diameter.

According to a further embodiment, the entrance apertures may be provided with deformable metallic sealing lips which, when the pressure agent probe is first and once inserted, sealingly rest against it, as a result of which, due to an inward inclination of the sealing lips, the sealing effect is intensified as a result of the application of pressure.

In still a further embodiment of the above-mentioned sleeve, the central portion is lined with an insert made of a material with a lower yield point forming a cylindrical inner sleeve. The advantage of this design refers to further savings in costs while the effect remains essentially unchanged. The sleeves in accordance with the invention may be produced in a die or punching device in a simple way in the form of initially purely cylindrical tubular portions.

Preferred embodiments of the invention are illustrated in the drawings in the form of shafts designed as crankshafts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a shaft with sleeves in accordance with the invention, in three different embodiments;

FIG. 2A is an enlarged portion A of FIG. 2; FIG. 2B is an enlarged portion B of FIG. 2; and FIG. 3 shows an assembled shaft with sleeves in accordance with the invention.

DETAILED DESCRIPTION OF THE PREFERRED EMBODIMENTS

Figure 1:
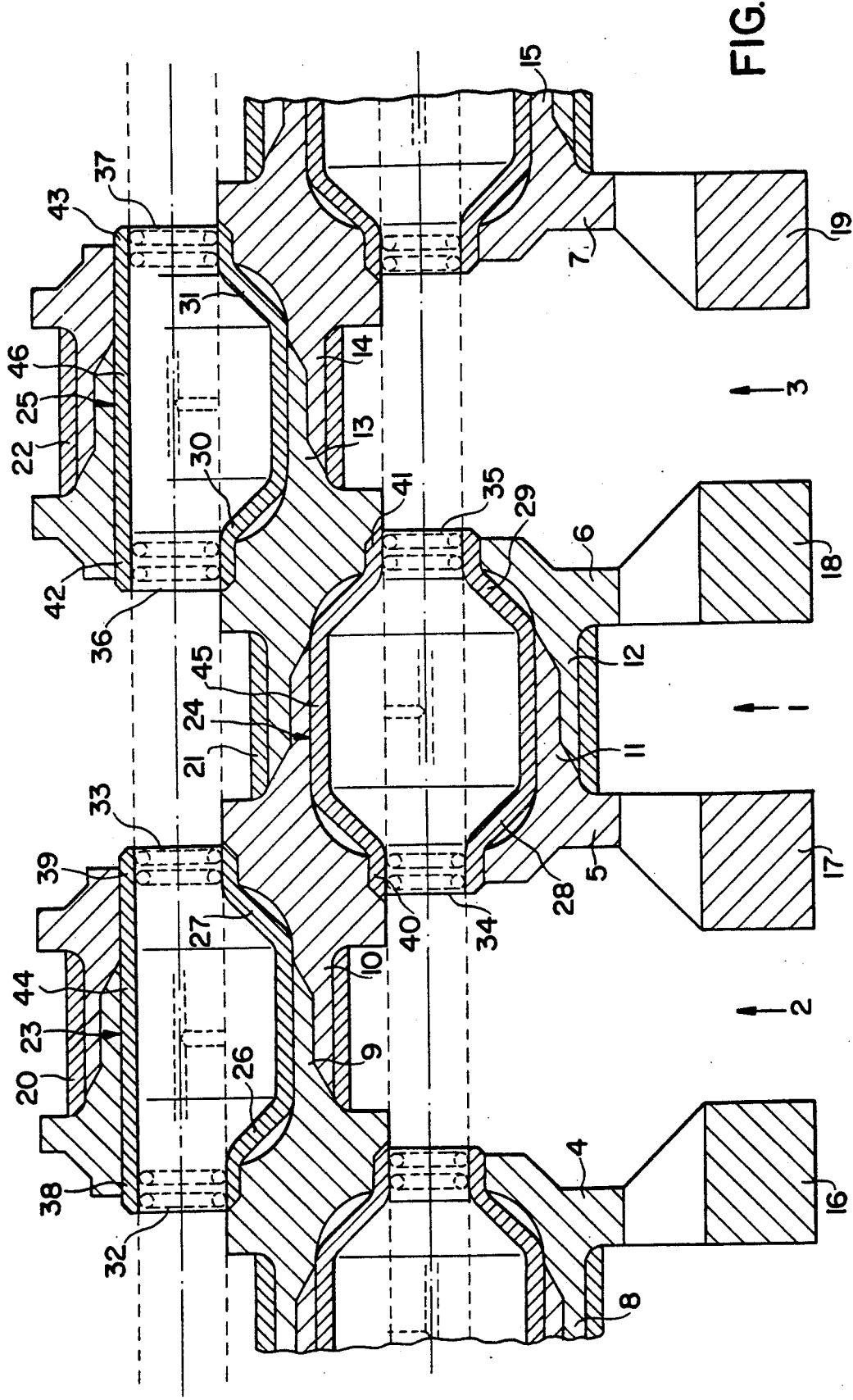
FIG. 1 shows a shaft with sleeves in accordance with the present invention, in two embodiments.

FIG. 1 illustrates a portion of a crankshaft having a main bearing pin 1 and two crank bearing pins 2, 3 and being composed of individual crank webs 4, 5, 6, 7 with adjoining sleeve projections 8, 9; 10, 11; 12, 13; 14, 15 (inserted into each other in pairs) of a basic and main pin. Furthermore, the crank webs are provided with counter weights 16, 17, 18, 19. The sleeve projections (fitted into each other) of every main and crank pin have been inserted into bearing sleeves 20, 21, 22 made of a material with a higher yield point, and slid on to sleeves 23, 24, 25 with central portions 44, 45, 46 and end faces 26, 27, 28, 29, 30, 31 having apertures 32, 33, 34, 35, 36, 37 whose diameter is smaller than the inner diameter of the sleeves 23, 24, 25. The end faces have a conical shape and the apertures have been provided in cylindrical projections 38, 39, 40, 41, 42, 43, with the cylindrical projections 38, 39, 42, 43 in the crank pins 2, 3 being radially outwardly offset in the end faces and providing sealing regions whereas the cylindrical projections 40, 41 are arranged coaxially in the sleeve 24 of the main pin 1. Such a design permits a large load-bearing cross-section of the crank webs and allows the use of one single continuous probe for all main bearing pins and all crank bearing pins in the same angular position. The slightly conical end faces, together with the crank webs, enclose annular or sickle-shaped lubricant chambers which are not given a reference number. The dashed lines refer to pressure agent probes with double seals inserted into the sleeves.

FIG. 2 also shows a portion of a crankshaft with two main bearing pins 101, 102 and a crank bearing pin 103. These again are formed of crank webs 104, 105, 106, 107 with sleeve-shaped projections 108, 109, 110, 111, 112, 113 whose sleeve projections (fitting into each other) are inserted into each other via sleeves 114, 118, 122 in accordance with the invention.

A first sleeve 114 illustrated on the left of FIG. 2 comprises a cylindrical center portion 115 and end faces 116, 117 which are recessed inwardly approximately conically, which almost abut in the central plane and comprise small apertures 132, 133. To widen the sealing region, these end faces are widened inwardly. It can be seen that the sealing effect is intensified by the application of pressure by the pressure agent probe illustrated in thin lines.

The second sleeve 118 in the crank pin comprises a cylindrical center portion 119 and, while retaining a uniform wall thickness, end faces 120, 121 which are bent inwardly in a funnel-like way and whose apertures 134, 135, with internal pretension, may rest against the probe(s). The pressure agent probe is preferably inserted from one end, with a counter plug being inserted from the other end, because according to detail "A" shown in FIG. 2A there has been provided a kind of deformable burr 127 as the only sealing element 127 which sealingly rests against the probe when it is inserted.

The third sleeve 112 illustrated on the right of FIG. 2 comprises a cylindrical center portion 123 and end faces 124, 125 with a radially inwardly increasing wall thickness which, in the apertures 136, 132, form wide sealing regions, with an inner sleeve 126 of a material with a lower yield point being inserted into the central portion 123 which is integral with the end faces. Detail "B" showing in FIG. 2B refers to the design of the sealing regions of sleeve 122 indicating annular grooves 128, 129 with O-rings 130, 131 inserted into them. Because of the undeformable design of the end faces, this additional seal is advantageous.

The apertures in the crank webs, in an advantageous manner, are no larger than required for introducing the probes.

FIG. 3 again shows a portion of a crankshaft indicating part of two main bearings 201, 202 and a crank bearing 203 in its entirety. Again the crankshaft is composed of individual portions comprising crank webs 204, 205, with the crank webs having sleeve projections 206, 207, 208, 209, 210 which, while complementing each other and forming complete pins, have been inserted into bearing sleeves 212, 213 and 214 and slid on to sleeves 215, 216, 217 in accordance with the invention. As explained exclusively with reference to the sleeve 216, these consist of a cylindrical sleeve 218 and conical end wall parts 219, 220 inserted into it individually with apertures 223, 224 which are pressed into the sleeves and attached thereto by gluing or soldering. An approximately cylindrical intermediate part 221 with a radial bore 222 may serve as a spacer for the conical end walls 219, 220 during the inserting operation. However, this part may also be eliminated.

While the invention has been illustrated and described as embodied in an assembled shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An assembled shaft, comprising:
   tubular members; and
   sleeves inserted into the tubular members so as to connect adjoining tubular portions of said tubular members, the sleeves being radially deformed beyond their limit of elasticity by internal pressure application, the sleeves (23, 24, 25; 114, 118, 122; 215, 216, 217) each comprising a cylindrical central portion with an enlarged diameter (44, 45, 46; 115, 119, 123; 218) so as to rest against the adjoining tubular portion of the tubular member, the sleeves also having end faces (26-31; 116, 117, 120, 212, 124, 125; 219, 220) with round apertures having a smaller diameter (32-37; 132-137; 223, 224) forming sealing regions for sealing on a diameter which is reduced as compared to the central portion.

2. A shaft according to claim 1, wherein the sealing regions are positioned in cylindrical projections (38-43) adjoining the end faces (26-31).

3. A shaft according to claim 1, wherein the sealing regions are provided in essentially radial end faces (124, 125) having a wall thickness which increases relative to that of the central portion (123).

4. A shaft according to claim 1, wherein the end faces (116, 117; 124, 125) have a wall thickness which increases inwardly.

5. A shaft according to claim 1, wherein the sealing regions are provided in end faces (120, 121) which have an approximately uniform wall thickness and which, relative to the central portion (119), are recessed axially inwardly.

6. A shaft according to claim 1, and further comprising plastically deformable sealing lips (127) formed on to the sealing regions.

7. A shaft according to claim 1, and further comprising flexible sealing rings (130, 131) inserted into grooves (128, 129) in the sealing regions.

8. A shaft according to claim 1, wherein the sleeves (122) are made of a first material and comprise a central portion (123) with an insert (126) made of a second material with a lower yield point.

9. A shaft according to claim 1, wherein the round apertures (32, 33; 36, 37) of the sleeves (23, 25) (32, 33; 36, 37) are eccentrically displaced relative to the cylindrical central portion (44, 46) and sealing regions.

10. A shaft according to claim 1, wherein the end faces of the sleeves are in planar for contacting with parts of the tubular members.

11. A shaft according to claim 1, wherein the sleeves consist of a material suitable for being alloyed with the material of the tubular members.

12. A shaft according to claim 1, wherein the sleeves consist of non-ferrous metals.

13. A shaft according to claim 12, wherein the sleeves consist of one of aluminum, magnesium, titanium, copper and brass.

14. A shaft according to claim 1, wherein the sleeves are inserted into the tubular members so as to attach elements slid onto the tubular members.

15. A shaft according to claim 14, wherein the end faces of the sleeves are in planar for contacting with parts of the elements slid on to the tubular members.

16. A shaft according to claim 1, wherein the sleeves consist of non-ferrous metal alloys.

17. A shaft according to claim 1, wherein the adjoining tubular portions abut each other.

18. A shaft according to claim 1, wherein the adjoining tubular portions are inserted into each other.

* * * * *